(12) United States Patent
Cocchi et al.

(10) Patent No.: US 11,582,985 B2
(45) Date of Patent: Feb. 21, 2023

(54) STIRRER OF A MACHINE FOR MAKING LIQUID OR SEMI-LIQUID PRODUCTS AND MACHINE COMPRISING THE STIRRER

(71) Applicant: ALI GROUP S.R.L. - CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 178 days.

(21) Appl. No.: 16/902,616

(22) Filed: Jun. 16, 2020

(65) Prior Publication Data
US 2020/0397017 A1     Dec. 24, 2020

(30) Foreign Application Priority Data
Jun. 21, 2019   (IT) ........................ 102019000009762

(51) Int. Cl.
| | |
|---|---|
| *A23G 9/22* | (2006.01) |
| *A23G 9/12* | (2006.01) |
| *A23G 9/28* | (2006.01) |

(52) U.S. Cl.
CPC .............. *A23G 9/224* (2013.01); *A23G 9/12* (2013.01); *A23G 9/228* (2013.01); *A23G 9/281* (2013.01)

(58) Field of Classification Search
CPC . A23G 9/106; A23G 9/12; A23G 9/22; A23G 9/222; A23G 9/224; A23G 9/281
See application file for complete search history.

(56) References Cited

U.S. PATENT DOCUMENTS

| | | | |
|---|---|---|---|
| 1,934,283 A | 11/1933 | Emery et al. | |
| 2,576,995 A * | 12/1951 | Carvel | A23G 9/224 |
| | | | 366/310 |

(Continued)

FOREIGN PATENT DOCUMENTS

| | | | | |
|---|---|---|---|---|
| CN | 106472802 A * | 3/2017 | | |
| EP | 1787713 A1 * | 5/2007 | ............. | A23G 9/224 |

(Continued)

OTHER PUBLICATIONS

Italian Search Report dated Feb. 11, 2020 from counterpart Italian App No. IT201900009762.

*Primary Examiner* — Miguel A Diaz
(74) *Attorney, Agent, or Firm* — Shuttleworth & Ingersoll, PLC; Timothy J. Klima (57) ABSTRACT

The invention relates to a stirrer of a machine for making liquid or semi-liquid products, including a rotary body which is housed coaxially in a batch freezer cylinder to rotate about its central axis and which is provided with a plurality of vanes each provided with at least one scraping member for scraping the cylindrical inside wall of the batch freezer cylinder; each scraping member includes a blade and a supporting element for supporting the blade; each blade has, on one side of it, a scraping profile, disposed substantially in contact with the cylindrical inside wall of the batch freezer cylinder and, on the opposite side of it, a coupling profile for coupling it to the respective supporting element and disposed along a longitudinal peripheral edge of the supporting element itself; a longitudinal groove is undercut along the aforementioned edge and the coupling profile is removably shape-fitted therein.

11 Claims, 5 Drawing Sheets

(56) References Cited

U.S. PATENT DOCUMENTS

| | | | | |
|---|---|---|---|---|
| 2,746,730 | A | * | 5/1956 | Swenson ............ B01F 27/1142 |
| | | | | 62/343 |
| 3,035,420 | A | * | 5/1962 | Stoelting ................ A23G 9/224 |
| | | | | 366/310 |
| 3,037,748 | A | * | 6/1962 | Wakeman ............. B01F 27/092 |
| | | | | 366/288 |
| 3,061,281 | A | * | 10/1962 | Phelan .................. A23G 9/281 |
| | | | | 366/196 |
| 3,214,146 | A | * | 10/1965 | Wakeman ............. A23G 9/224 |
| | | | | 416/231 A |
| 3,214,147 | A | * | 10/1965 | Wakeman ............. A23G 9/224 |
| | | | | 366/294 |
| 3,641,783 | A | * | 2/1972 | Werner .................. A23G 9/224 |
| | | | | 62/343 |
| 4,162,127 | A | * | 7/1979 | Wakeman ............. A23G 9/224 |
| | | | | 62/343 |
| 4,223,996 | A | * | 9/1980 | Mathis ............. B01F 35/71775 |
| | | | | 366/38 |
| 4,956,980 | A | * | 9/1990 | Carvel .................. A23G 9/163 |
| | | | | 366/322 |
| 5,018,363 | A | * | 5/1991 | Aoki ...................... A23G 9/228 |
| | | | | 366/177.1 |
| 5,644,926 | A | * | 7/1997 | Kress .................... A23G 9/228 |
| | | | | 15/236.1 |
| 6,324,964 | B1 | * | 12/2001 | Niederberger .......... A47J 31/40 |
| | | | | 99/302 R |
| 6,494,055 | B1 | * | 12/2002 | Meserole ............... A23G 9/163 |
| | | | | 366/310 |
| 9,993,015 | B2 | * | 6/2018 | Geng .................. B01F 35/2207 |
| 10,542,766 | B2 | * | 1/2020 | Cocchi .................... A23G 9/224 |
| 11,033,044 | B1 | * | 6/2021 | Fonte .................... A47J 31/407 |
| 2002/0194865 | A1 | * | 12/2002 | Krylov ...................... C02F 1/22 |
| | | | | 62/544 |
| 2016/0366906 | A1 | * | 12/2016 | Geng ............. B01F 35/221422 |
| 2017/0273335 | A1 | * | 9/2017 | Cocchi .................... A23G 9/42 |
| 2019/0373913 | A1 | * | 12/2019 | Velez .................... A23G 9/166 |
| 2020/0221726 | A1 | * | 7/2020 | Cocchi .................... B01F 35/92 |
| 2020/0352193 | A1 | * | 11/2020 | Cocchi .................... A23G 9/22 |
| 2021/0212338 | A1 | * | 7/2021 | Fonte .................... A23G 9/083 |
| 2021/0329939 | A1 | * | 10/2021 | Lazzarini ............... B01F 35/93 |
| 2021/0329940 | A1 | * | 10/2021 | Lazzarini ............... A23G 9/045 |
| 2021/0368819 | A1 | * | 12/2021 | Fonte ................. B65D 85/8043 |
| 2022/0030906 | A1 | * | 2/2022 | Springer ............... A23G 9/045 |

FOREIGN PATENT DOCUMENTS

| | | | | |
|---|---|---|---|---|
| EP | 2679100 | A1 | | 1/2014 |
| EP | 3050616 | A1 | * | 8/2016 ............ A23G 9/12 |
| EP | 3222150 | A1 | | 9/2017 |
| EP | 3266311 | A1 | | 1/2018 |
| EP | 3735834 | A1 | * | 11/2020 ............ A23G 9/12 |
| GB | 2014055 | A | * | 8/1979 ............ F28F 19/008 |
| GB | 2232469 | A | * | 12/1990 ............ A23G 9/04 |
| KR | 20110043951 | A | * | 4/2011 |
| WO | 9738280 | A1 | | 10/1997 |
| WO | WO-2015006802 | A1 | * | 1/2015 ............ A23G 9/04 |
| WO | WO-2020037296 | A1 | * | 2/2020 ............ A23G 9/08 |
| WO | WO-2020236173 | A1 | * | 11/2020 |

* cited by examiner

STIRRER OF A MACHINE FOR MAKING LIQUID OR SEMI-LIQUID PRODUCTS AND MACHINE COMPRISING THE STIRRER

This application claims priority to Italian Patent Application 102019000009762 filed Jun. 21, 2019, the entirety of which is incorporated by reference herein.

BACKGROUND OF THE INVENTION

The invention relates to a stirrer of a machine for making liquid or semi-liquid products.

More specifically, by way of non-limiting example, reference is made in this description to machines for making and dispensing ice cream.

In machines of this kind, the part which constitutes the core of the machine is a cylinder known in the trade as batch freezer cylinder.

In effect, this part is in the form of a metal cylinder having cooling means distributed around the outside of (or within) its sidewalls and designed to reduce the temperature inside the cylinder in order to cool a base product contained therein to make the finished product (ice cream).

Inside the cylinder, the machine is equipped with a power-driven stirrer which not only mixes the base product continuously to make the finished ice cream as smooth as possible but, at the same time, also causes the finished ice cream to advance towards a dispensing nozzle.

Since the inside wall of the batch freezer cylinder is subject to the highest cooling effect, one problem suffered by these machines regards the formation of a layer of ice or frozen basic product on the inside wall of the batch freezer cylinder.

This must be avoided and to do that, the stirring element must be shaped in such a way as to keep the inside wall of the batch freezer cylinder well free of the ice cream product. The above helps keep the ice cream product at an ideal temperature and consistency so that when it is extracted from the cylinder for final use, it is in the ideal conditions for consumption, creamy and without micro crystals.

In effect, to give the ice cream an optimal creamy texture, the ice crystals resulting from the batch freezing process must have small dimensions.

The stirring element is usually configured as a body provided with two or more vanes (or prongs) distributed in such a way that when they rotate, they define a cylindrical surface that approximates the cylindrical inside surface of the batch freezer cylinder.

The length of the vanes approximates the inside length of the batch freezer cylinder.

Further, each vane is provided with elements, called "scrapers", which prevent the formation of a layer of ice by continuously scraping the inside wall of the batch freezer cylinder while the stirrer rotates.

The scrapers are made in the form of appendages attached to the vanes and movable radially with respect to the inside surface of the batch freezer cylinder.

The scrapers are attached to spring elements which allow them to move to keep the scraping appendages in contact with the inside surface of the batch freezer cylinder.

At the contact surface of it, each scraping appendage has the shape of a blade intended to provide the maximum scraping effect to prevent ice from forming, as described above.

One drawback of such a solution is that replacing a worn blade with a new one is a particularly painstaking and time consuming task.

Another drawback is the cost of the component, in the sense that once the blade loses its scraping effect, it is necessary to replace the entire scraping appendage or, in the best of cases, where possible, to sharpen the blade.

Yet another drawback is that it may sometimes be necessary to use blades of different thicknesses and properties, depending on what the machine has to be used for in the months to follow: in this case, too, removing the blade is not an easy task.

SUMMARY OF THE INVENTION

This invention has for an aim to provide a machine for making liquid or semi-liquid products to overcome the above mentioned drawbacks of the prior art.

More specifically, the aim of this invention is to provide a stirrer of a machine for making liquid or semi-liquid products with which it is possible to act on the scraper in such a way as to considerably increase the effectiveness, performance and durability of the scraping member.

Another aim of the invention is to provide a stirrer of a machine for making liquid or semi-liquid products that allows the scraping blade to be quickly and easily replaced and adapted to suit different use requirements of the machine.

These aims are fully achieved by the stirrer according to the invention as characterized in the appended claims.

BRIEF DESCRIPTION OF THE DRAWINGS

The innovative features of the invention, and the advantages it offers, will become more apparent from the following description of a preferred, non-limiting embodiment of it, provided solely by way of example, with reference to the accompanying drawings, in which.

DESCRIPTION OF THE PREFERRED EMBODIMENTS

Figure 1:
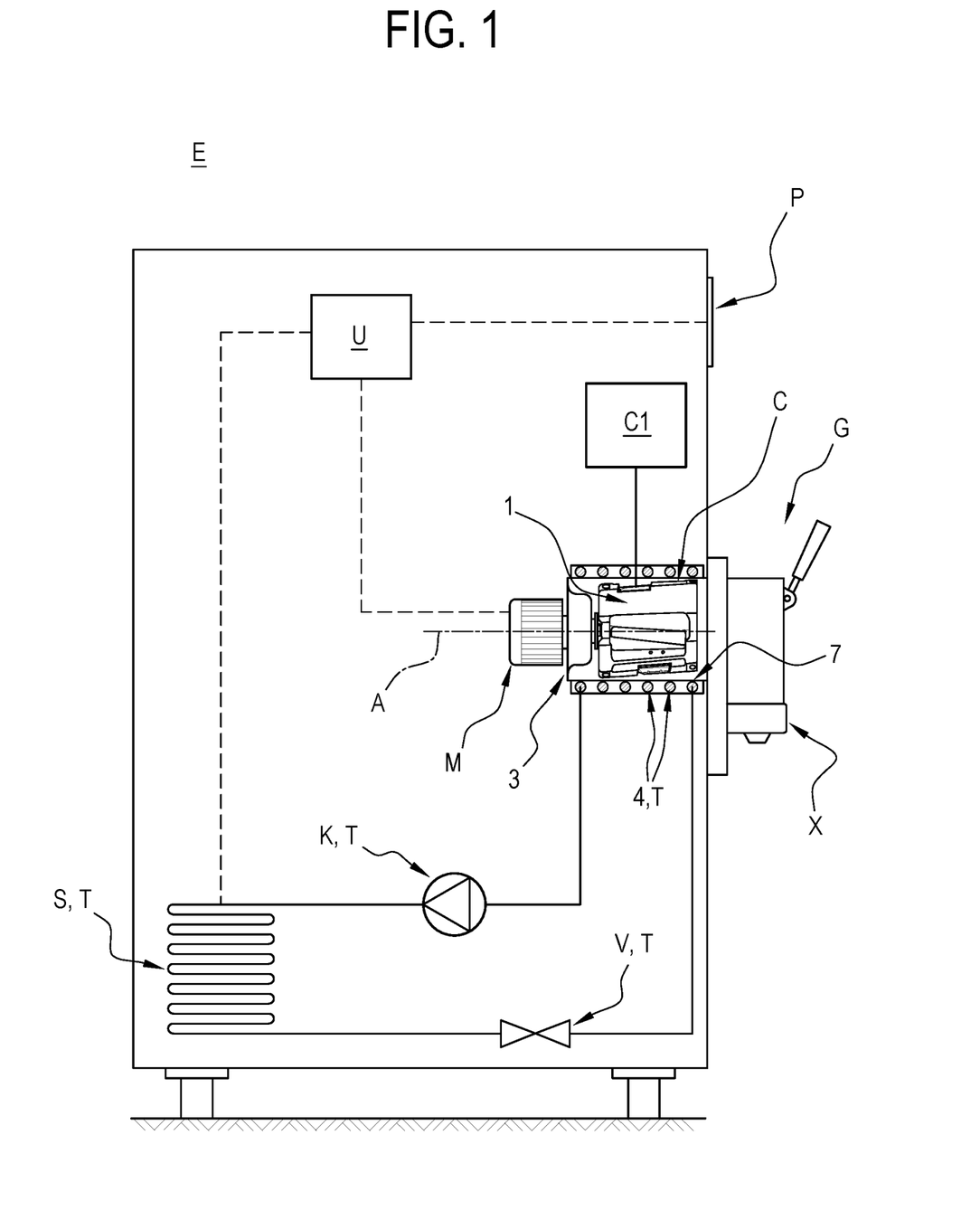
FIG. 1 illustrates an embodiment of the stirrer of this invention, mounted inside the batch freezer cylinder of a machine for making liquid or semi-liquid products.

With reference to FIG. 1, the numeral 1 denotes in its entirety a stirrer of a machine G for making liquid or semi-liquid products, specifically a machine G for making and dispensing ice cream (both the stirrer 1 and the machine G being objects of this invention).

The stirrer 1 comprises a rotary body 2 (illustrated in FIG. 2), which is housed coaxially in a batch freezer cylinder 3 of the machine G to rotate about its central axis A.

The function of the batch freezer cylinder 3, which is cooled in known manner by a coil 4, is to receive the product to be cooled, to process it to make a consumable product and to store it as such inside it thanks to the continuous rotation of the stirrer 1. The rotation direction of the stirrer 1 is labelled 1r in FIG. 2.

Figure 2:
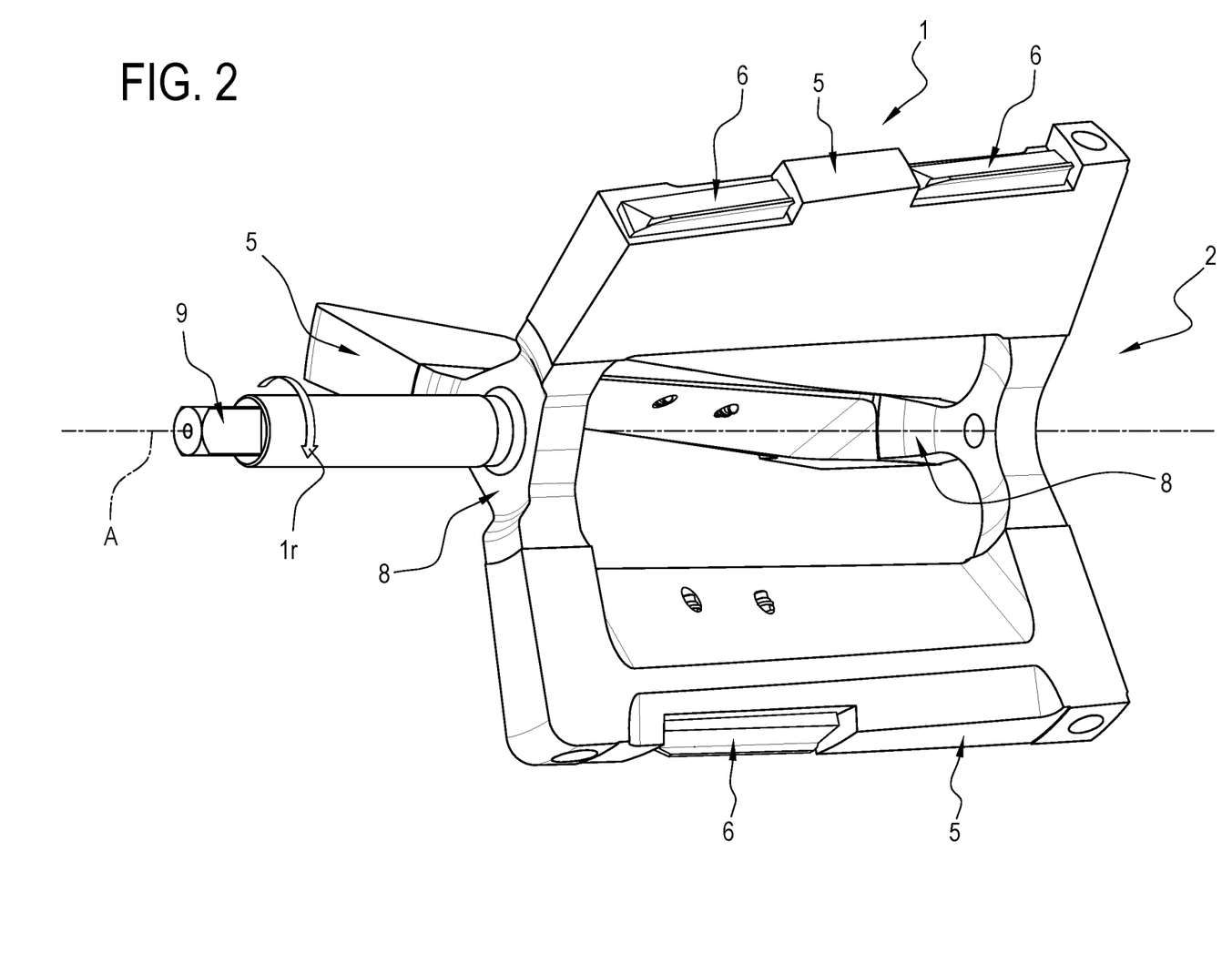
FIG. 2 is a perspective view of the stirrer of the invention.

The stirrer 1 is provided with a plurality of vanes 5, disposed around the aforementioned axis A at a radially peripheral position and each provided with at least one scraping member 6 for scraping the cylindrical inside wall 7 of the batch freezer cylinder 3.

More specifically, in an embodiment, the stirrer 1 comprises a set of three vanes 5 spaced at 120° from each other about the axis A.

The vanes 5 are mounted between two supporting starwheels 8 which are placed opposite each other and from one of which a rotation shaft 9 extends when coupled to a motor M of the machine G.

Figure 3:
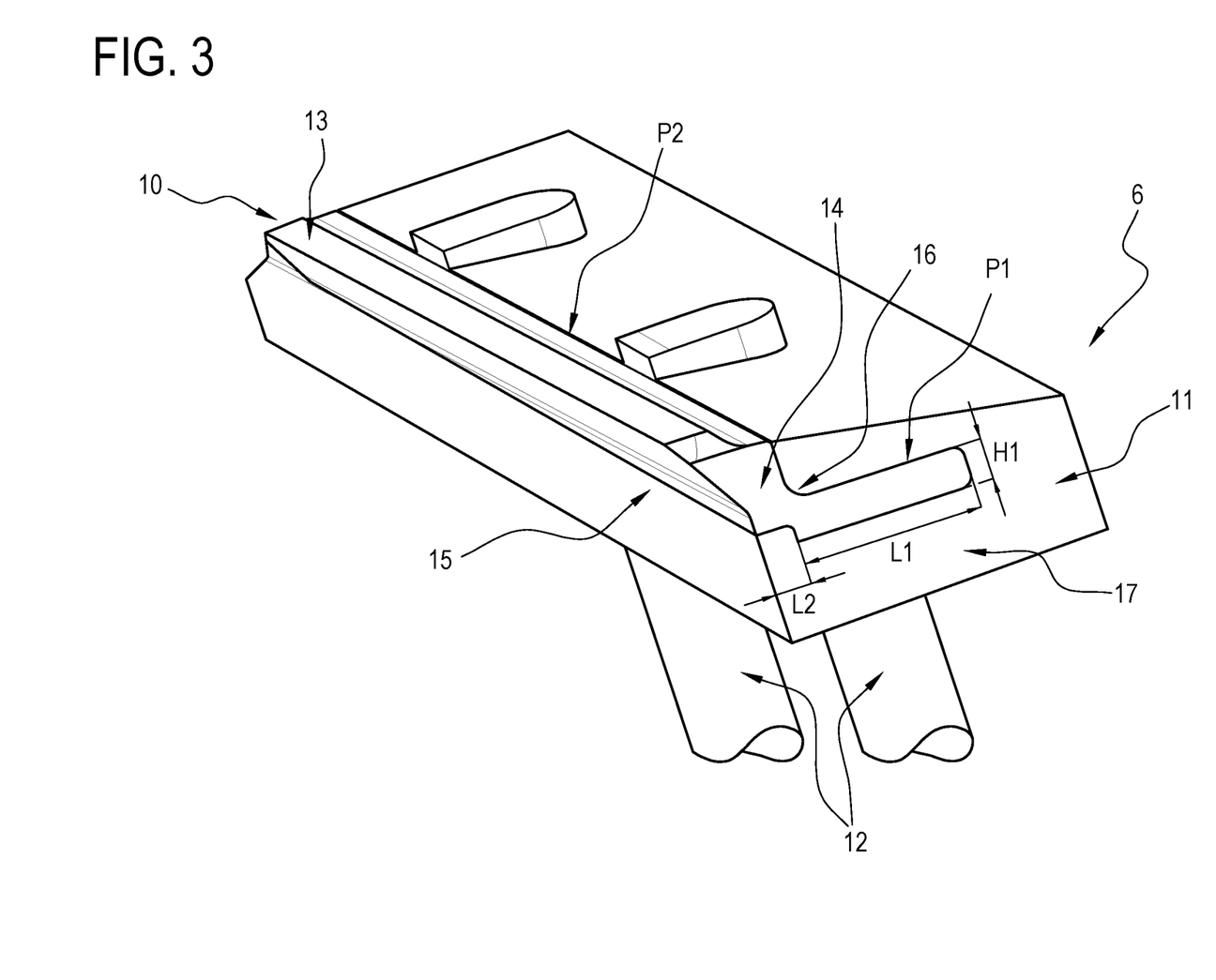
FIG. 3 is a perspective view of a detail of the stirrer according to a first embodiment.

As shown in FIG. 3, each scraping member 6 comprises a blade 10 and a supporting element 11 for supporting the blade 10.

The supporting element 11 is made of metal, preferably stainless steel.

Preferably, also, the blade 10 is made as a single part of plastic material. This allows the blade 10 to be made inexpensively by a simple molding process.

The supporting element 11 is coupled to the respective vane 5 preferably in a such a way it can be removed therefrom. For this purpose, the supporting element 11 is provided with a pair of cylindrical appendages 12 adapted to be inserted into respective cylindrical sockets of the vane 5, preferably with interposed elastic means: for example, helical springs (not illustrated) disposed around the outside surface of the appendages 12.

The action of the springs allows pushing the blade 10 elastically against the cylindrical inside surface 7 of the batch freezer cylinder 3 for a more effective scraping action. This action may be enhanced or replaced by a specific elastic action inherent in the blade 10 if the blade is made of a suitably elastic, flexible plastic material.

Each blade 10 has, on one side of it, a scraping profile 13, disposed substantially in contact with the cylindrical inside wall 7 of the batch freezer cylinder 3 and, on the opposite side of it, a coupling profile 14 for coupling it to the respective supporting element 11 and disposed along a longitudinal peripheral edge 15 of the supporting element 11 itself.

In the context of the invention described here, above and in what follows, the term "longitudinal" is used to denote an orientation in the main direction of extension of the vanes 5 between the two supporting starwheels 8.

A longitudinal groove 16 is undercut along the edge 15 and the coupling profile 14 is removably shape-fitted therein.

In other words, the supporting element 11 has an edge 15 provided with a longitudinal undercut groove 16 in which the coupling profile 14 is shape-fitted in a removable manner.

More specifically, viewed transversely, the groove 16 has the shape of a Z, to form a step that prevents the coupling profile 14, hence the blade 10, to be transversely disengaged from the groove 16 during rotation of the stirrer 1 in use.

Alternatively, viewed transversely, the groove 16 has a dovetail shape, again for the purpose of preventing the coupling profile 14, hence the blade 10, to be transversely disengaged from the groove 16 during rotation of the stirrer 1 in use.

At the same time, the groove 16 is provided with a (lateral) inlet opening 17 through which the coupling profile 14 can be made to slide longitudinally along the groove 16 itself so that it can be inserted into the groove 16 or extracted from the groove 16.

The disengageable coupling between the blade 10 and its supporting element 11 thus allows the blade 10 to slide in and out so it can be replaced quickly and easily.

Figure 5:
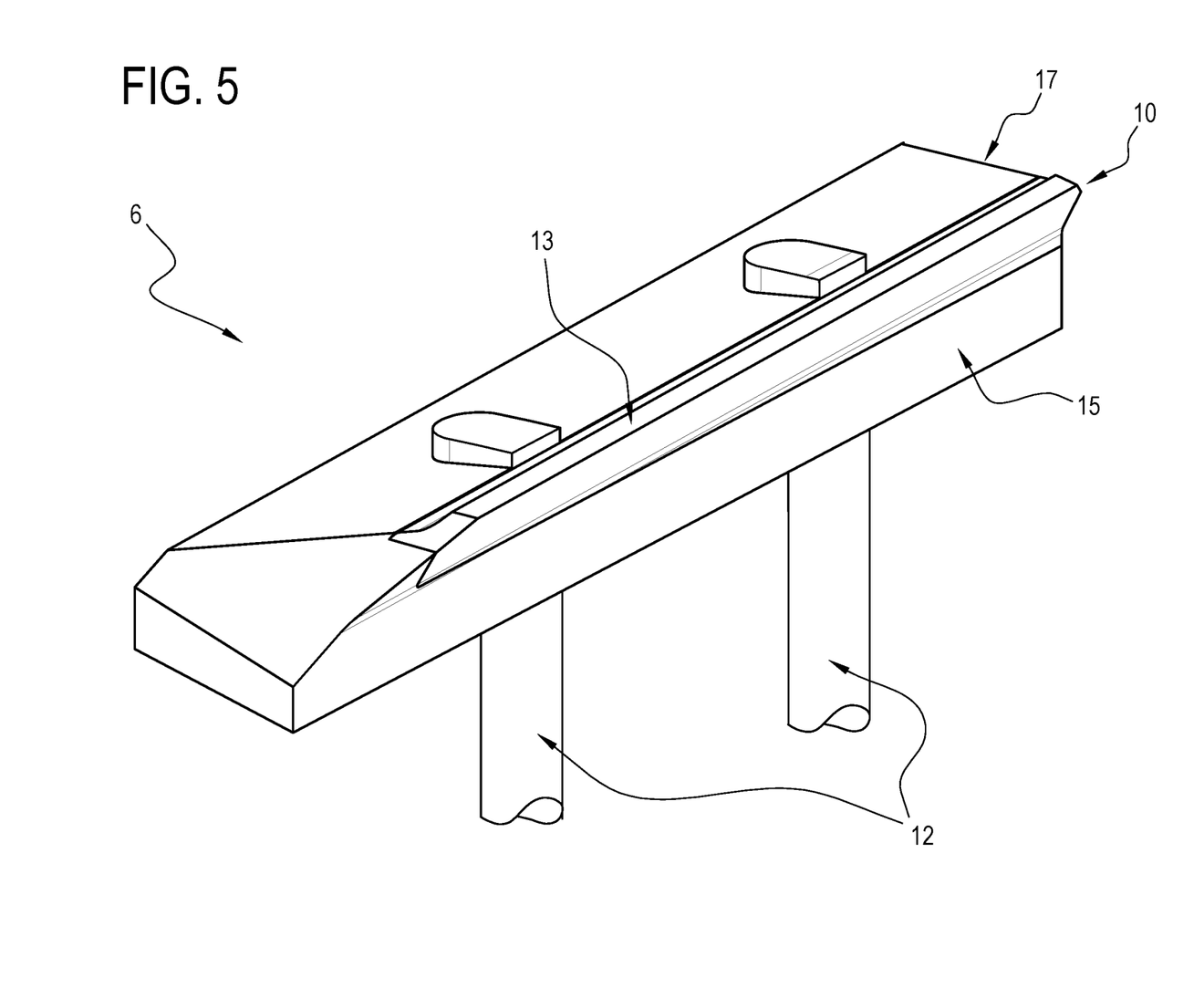

As illustrated in detail in FIG. 5, the groove 16 is closed at the longitudinal end opposite the inlet opening 17 so as to prevent the coupling profile 14, hence the blade 10, to slide out of the groove 16 during rotation of the stirrer 1 in use.

Closing the groove 16 at one end only is sufficient for the above mentioned purpose because the stirrer 1 rotates only in one direction (labelled 1r) and when rotating in this direction, the blade is pushed against the closed end of the groove 16.

The groove 16 has two undercut portions, in communication with each other, adapted to house the blade 10.

Similarly, the blade 10 has two portions: a first portion P1, adapted to allow the blade to be held in place in the groove 16 by an undercut, and a second portion P2, which has the scraping profile 13 on it.

As shown clearly in FIG. 3, the portion P1 extends for a length L1 greater than the length L2 of the portion P2 (preferably, the portion P1 is twice as long as the portion P2).

With reference to the first portion P1, on the other hand, the thickness H1 (orthogonal to the length L1) is less than 50% (preferably less than ⅓) of L1.

Figure 4:
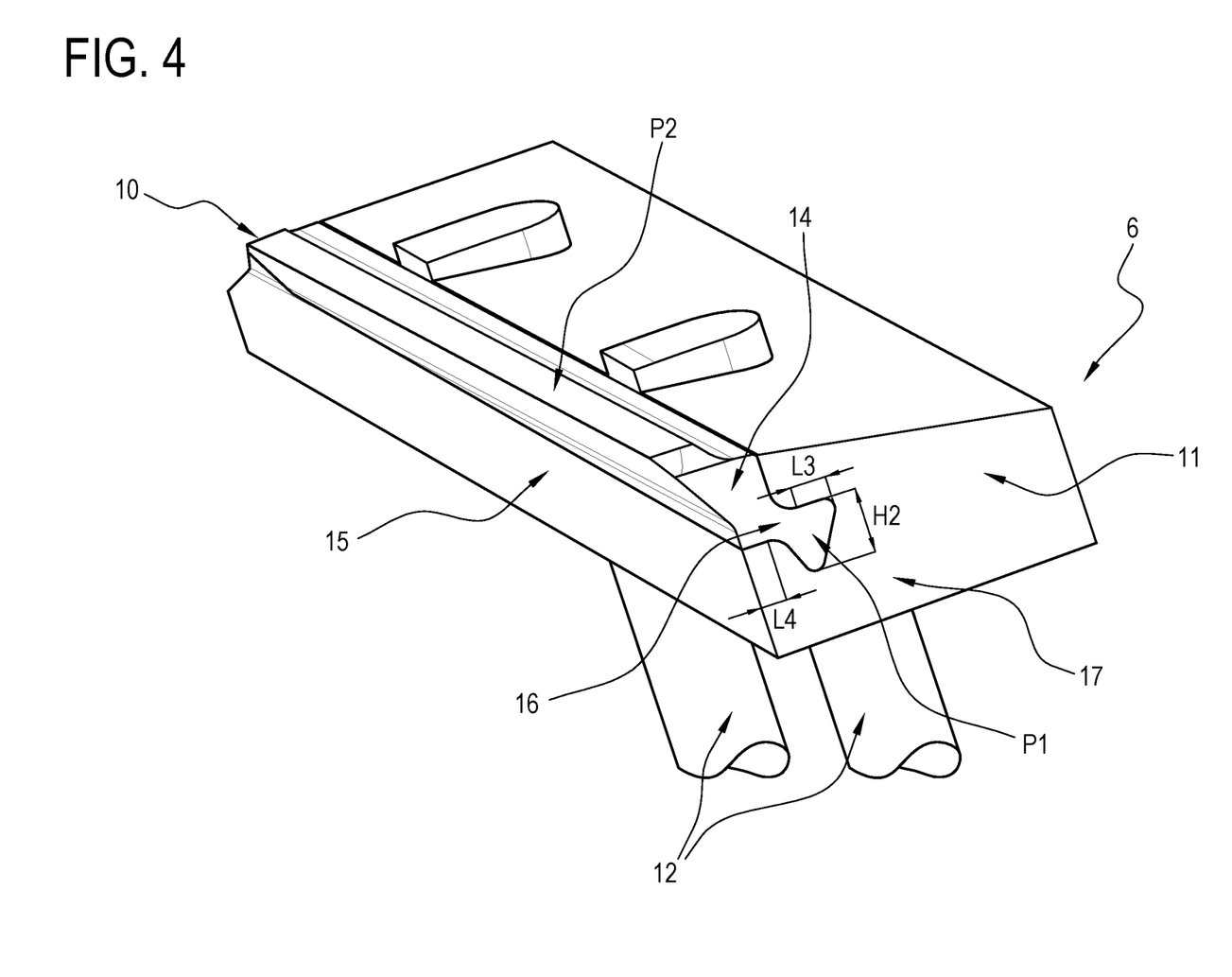
FIGS. 4 and 5 show respective perspective views of a detail of a further embodiment of the stirrer.

In an alternative embodiment, illustrated in FIG. 4, the portion P1 has a more compact, less elongate shape than the shape it has in the embodiment of FIG. 3.

More specifically, as may be inferred from FIG. 4, the portion P1 in this embodiment extends for a length L3 substantially equal to the length L4 of the portion P2 (preferably, the portion P1 extends for a length L3 that is between 80% and 120% of the length L4 of the portion P2).

Again with reference to the portion P1, the thickness H2 (at right angles to the length L3 of the portion P1) is greater than the length L3 (preferably more than 150% of the length L3).

Preferably, also, the blade 10 is made of plastic material.

Still more preferably, the blade 10 is made of polyoxymethylene, also known as acetalic resin, or of polyvinylidene fluoride, also known as PVDF.

Advantageously, that way, the blade 10 is subject to wear, whilst the inside wall of the container (batch freezer cylinder 3), which is scraped by the blade 10, is protected against wear.

It should be noted that one advantage of this invention is that the blade 10, when worn, can be easily removed from its supporting element 11 and replaced with a new blade 10.

Also defined according to this invention and labelled G in FIG. 1, is a machine for making liquid or semi-liquid products, specifically a machine G for making and dispensing ice cream.

The machine G comprises a container C for a liquid or semi-liquid base product.

In a first embodiment, the container C comprises at least one tank made inside the machine G.

In a preferred embodiment, the container C is defined by the batch freezer cylinder 3.

In a further embodiment, illustrated in FIG. 1, the machine G comprises a further container C1, operatively connected to the batch freezer cylinder 3 and configured to hold the liquid or semi-liquid base product before it is transferred into the container C.

Preferably, the liquid or semi-liquid base product comprises at least one of the following products in a variable proportion: milk, sugar, eggs, vegetable fats, vegetable oils, flavorings, thickening agents, stabilizers and emulsifiers.

Preferably, the batch freezer cylinder 3 is cylindrical in shape and comprises a cylindrical inside wall 7, configured to delimit the space of the batch freezer cylinder 3.

The batch freezer cylinder 3 is configured to process the liquid or semi-liquid base product, transferred from the container C1 to the batch freezer cylinder 3, to make a liquid or semi-liquid product, preferably an ice cream product.

In an embodiment, the batch freezer cylinder 3 is mounted in the machine G with its axis of longitudinal extension parallel (horizontally) to a surface that supports the machine G.

In an alternative embodiment, the batch freezer cylinder 3 is mounted in the machine G with its axis of longitudinal extension inclined (preferably vertically) to the surface that supports the machine G.

The machine G also comprises the stirrer 1 mounted inside the batch freezer cylinder 3 (the stirrer 1 being of the type described in the foregoing).

Advantageously, the central axis A of the stirrer 1 coincides with the longitudinal axis of extension of the batch freezer cylinder 3.

Also as illustrated in FIG. 1, the machine G comprises a motor M configured to drive the stirrer 1 in rotation inside the batch freezer cylinder 3.

Through a transmission mechanism not illustrated, the motor M, once activated, drives the stirrer 1 which, as it rotates about its central axis A, stirs the liquid or semi-liquid base product inside the batch freezer cylinder 3 and scrapes the cylindrical inside wall 7 by means of the at least one scraping member 6.

In a preferred embodiment, the motor M is an electric motor, preferably brushless.

Advantageously, using a brushless motor M allows limiting the dimensions of the motor M and working under optimum performance conditions.

In addition, the machine G comprises a thermal system T that is operatively connected to the batch freezer cylinder 3.

The thermal system T is configured to exchange heat between the batch freezer cylinder 3 and the surrounding atmosphere E.

More specifically, the purpose of the thermal system T is to cool the environment and the liquid or semi-liquid base product inside the batch freezer cylinder 3 and to transfer the heat extracted to the surrounding atmosphere E so as to keep the final, liquid or semi-liquid product in a consumable condition.

Preferably, the thermal system T comprises a coil 4, coiled around the batch freezer cylinder 3, and has a heat exchanger fluid flowing through it.

The coil 4 also constitutes the first heat exchanger of the thermal system, the one that extracts heat from the interior of the batch freezer cylinder 3.

Advantageously, using the coil 4 allows optimizing the heat exchange surface and optimizing the process of cooling the environment inside the batch freezer cylinder 3.

Preferably, the thermal system T comprises a compressor K, an expansion valve V and a second heat exchanger S, configured to control the pressure of the refrigerant liquid or refrigerant gas circulating inside the thermal system T and to transfer heat to the surrounding atmosphere E.

Also as illustrated in FIG. 1, the machine G comprises a dispensing unit X, operatively connected to the batch freezer cylinder 3.

The dispensing unit X is configured to extract the processed liquid or semi-liquid product from the batch freezer cylinder 3.

Preferably, the dispensing unit X comprises a lever connected to a valve (neither of which is illustrated) to allow the processed liquid or semi-liquid product to be dispensed from the batch freezer cylinder 3.

Also preferably, the dispensing unit X comprises a nozzle, not illustrated, configured to expel the processed liquid or semi-liquid product from the machine G so that it can be collected in a container by a user.

Preferably, the machine also comprises a computerized control unit U operatively connected to the motor M and to the thermal system T.

The computerized control unit U is configured to drive the motor M to regulate the rotation speed of the stirrer 1 inside the batch freezer cylinder 3.

Advantageously, by varying the rotation speed of the stirrer 1 it is possible to control the properties of the liquid or semi-liquid product: for example, the overrun and consistency of the finished product.

The computerized control unit U is configured to drive the thermal system T to control heat exchange between the coil 4 and the batch freezer cylinder 3.

Advantageously, controlling the operation of the thermal system prevents portions of the liquid or semi-liquid product from solidifying inside the batch freezer cylinder 3 on account of the excessively low temperature inside it.

The machine G further comprises a control panel P which is operatively connected to the computerized control unit U.

The control panel P is configured to allow interaction between the machine G and a user.

Preferably, the control panel P comprises a display which is configured to display functional parameters of the machine such as, for example, the temperature inside the batch freezer cylinder 3.

Still more preferably, the control panel P comprises command keys which, if the control panel uses touchscreen technology, are displayed on the display itself.

The command keys are configured to allow the user to interact with the machine G, preferably by setting at least one functional parameter of the machine G.

In an embodiment, the machine G uses predefined programs stored inside it which the user can select through the command keys based on the liquid or semi-liquid product to be made.

What is claimed is:

1. A stirrer of a machine for making liquid or semi-liquid products, comprising:
   a rotary body which is configured to be housed coaxially in a batch freezer cylinder to rotate about a central axis of the rotary body, the rotary body including a plurality of vanes disposed around the central axis at a radially peripheral position, each of the plurality of vanes including a scraping member configured for scraping a cylindrical inside wall of the batch freezer cylinder;
   each scraping member comprising a blade and a supporting element for supporting the blade;
   each blade including, on one side, a scraping profile, disposed substantially in contact with the cylindrical inside wall of the batch freezer cylinder and, on an opposite side, a coupling profile for coupling to the respective supporting element and disposed along a longitudinal peripheral edge of the supporting element; and
   a longitudinal groove undercut along the longitudinal peripheral edge, the coupling profile being removably shape-fitted in the longitudinal groove;
   the longitudinal groove including two undercut portions, in communication with each other, adapted to house the blade; and
   the blade including two portions: a first portion adapted to allow the blade to be held in place in the longitudinal groove by the two undercut portions, and a second portion which includes the scraping profile.

2. The stirrer according to claim 1, wherein the longitudinal groove includes an inlet opening through which the coupling profile is configured to slide longitudinally along the longitudinal groove so that the coupling profile is insertable into the longitudinal groove or extractable from the longitudinal groove.

3. The stirrer according to claim 2, wherein the longitudinal groove is closed on the side longitudinally opposite to the inlet opening.

4. The stirrer according to claim 1, wherein the blade is made as one piece of plastic material.

5. The stirrer according to claim 1, wherein the supporting element is made of metal.

6. A machine for making liquid or semi-liquid products comprising:

the stirrer and the batch freezer cylinder according to claim 1;

the batch freezer cylinder configured to process the liquid or semi-liquid base product and defining a container for the liquid or semi-liquid base product;

the stirrer being mounted inside the container;

a motor configured to drive the stirrer in rotation inside the batch freezer cylinder;

a thermal system operatively connected to the batch freezer cylinder and configured to exchange heat between the batch freezer cylinder and the surrounding atmosphere;

a dispensing unit including a dispenser, operatively connected to the batch freezer cylinder and configured to extract the liquid or semi-liquid product from the batch freezer cylinder.

7. The machine according to claim 6, and further comprising a computerized control unit operatively connected to the motor and to the thermal system to drive the motor and the thermal system.

8. The machine according to claim 7, and further comprising a control panel, operatively connected to the computerized control unit and configured to allow interaction with a user.

9. The machine according to claim 6, and further comprising a further container, operatively connected to the container and configured to contain the liquid or semi-liquid base product before the liquid or semi-liquid base product is transferred into the container.

10. The stirrer according to claim 1, wherein the blade is made as one piece of an elastic plastic material.

11. The stirrer according to claim 1, wherein the supporting element is made of stainless steel.

* * * * *